United States Patent
Lee et al.

(10) Patent No.: US 6,856,997 B2
(45) Date of Patent: Feb. 15, 2005

(54) APPARATUS AND METHOD FOR PROVIDING FILE STRUCTURE FOR MULTIMEDIA STREAMING SERVICE

(75) Inventors: Kyoung Woo Lee, Seoul (KR); Sang Hyup Lee, Seoul (KR)

(73) Assignee: LG Electronics Inc., Seoul (KR)

(*) Notice: Subject to any disclaimer, the term of this patent is extended or adjusted under 35 U.S.C. 154(b) by 412 days.

(21) Appl. No.: 10/040,192

(22) Filed: Oct. 26, 2001

(65) Prior Publication Data

US 2002/0062313 A1 May 23, 2002

(30) Foreign Application Priority Data

Oct. 27, 2000 (KR) .................................... 10-2000-63492

(51) Int. Cl.[7] ............................................. G06F 17/30
(52) U.S. Cl. ........................... 707/102; 707/1; 715/513; 379/41
(58) Field of Search .................... 707/1–10, 100–104.1, 707/200–205; 715/513; 379/41, 201; 709/230.217; 370/465; 725/54

(56) References Cited

U.S. PATENT DOCUMENTS

| | | | | |
|---|---|---|---|---|
| 5,634,050 A | * | 5/1997 | Krueger et al. ............. | 707/200 |
| 5,903,892 A | * | 5/1999 | Hoffert et al. ................ | 707/10 |
| 5,946,326 A | * | 8/1999 | Rinne .......................... | 725/54 |
| 6,041,345 A | * | 3/2000 | Levi et al. ................... | 709/217 |
| 6,134,243 A | * | 10/2000 | Jones et al. ................. | 370/465 |
| 6,766,007 B1 | * | 7/2004 | Dermler et al. ........ | 379/201.01 |

* cited by examiner

*Primary Examiner*—Mohammad Ali
(74) *Attorney, Agent, or Firm*—Lee, Hong, Degerman, Kang & Schmadeka

(57) ABSTRACT

In a file structure for a streaming service and a method for providing a streaming service, a file structure includes a header object having basic information about a file and information for an application service, a data object synchronizing multimedia data with temporal information and storing it, and a key index object storing an offset and temporal information of a video block having a key frame in video blocks as a basis on a time axis for random access and reproduction. Accordingly, data can be transmitted quickly by not including unnecessary additional data, an application region can be expanded by including other media file besides a video and an audio files, because a random access and random reproduction by key index information are possible, it is possible to support various reproduction functions such as a fast play, a reverse play and random reproduction, etc.

18 Claims, 2 Drawing Sheets

APPARATUS AND METHOD FOR PROVIDING FILE STRUCTURE FOR MULTIMEDIA STREAMING SERVICE

BACKGROUND OF THE INVENTION

1. Field of the Invention

The present invention relates to a streaming service, and in particular to a file structure for a streaming service, an apparatus and a method for providing a streaming service which is capable of transmitting data quickly by reducing waste of a network bandwidth by not including unnecessary files in file transmission and expanding an additional service by including a reserved field in a file.

2. Description of the Prior Art

Recently, according to sudden increase of services such as an Internet broadcasting, a VOD (video on demand), a live-casting, etc., people show much interest in a multimedia streaming technology.

Herein, a multimedia streaming means a technology assembling multimedia data such as audio/video data, constructing it as a stream according to a certain file format and transmitting it in real time. Accordingly, a computer user can play a pertinent multimedia stream by simply clicking a button on a web page without downloading a whole file.

In order to perform the above-mentioned multimedia streaming service, an encoder converting analog stream data into digital format data appropriate to streaming, a software managing transmission of contents in order to make possible a live-casting or on-demand multimedia stream subscription, and a multimedia streaming regenerator installed at a computer of the user and constructing and publishing multimedia contents are required. In addition, a channel velocity of a network connected to a server has to be carefully considered in order to provide ceaseless contents transmission and pictures having high picture quality.

Recently, there are various formats for the Internet service and live-casting such as an ASF (active streaming format), a RM (real media), etc., companies providing multimedia solutions have to support all file formats for Internet streaming service as well as a file format of their own by an agreement with the companies.

However, because the solution companies can record additional information unnecessary to users only for service operation of themselves, a quality of the streaming service can be lowered and secrets of users unwillingly can leak out.

SUMMARY OF THE INVENTION

It is an object of the present invention to provide a file structure for a streaming service which is capable of transmitting data quickly by reducing waste of a bandwidth in network transmission by not including unnecessary additional data and coping effectively with additional service expansion at need.

It is another object of the present invention to provide a method for providing a streaming service which is capable of transmitting each media data simultaneously or separately by having a structure dividable blocks according to data media type.

In order to achieve the above-mentioned objects, a file structure for a streaming service in accordance with the present invention includes a header object having basic information about a file and information for an application service, a data object synchronizing multimedia data with temporal information and storing it, and a key index object storing an offset and temporal information of a video block having a key frame in video blocks as a basis on a time axis for random access and reproduction.

In order to achieve the above-mentioned objects, a method for providing a streaming service includes a client/server connecting process for receiving header object information from a server and transmitting a transmission instruction to the server by a client, a transmission mode selecting process for selecting a transmission mode by receiving the transmission instruction and reading each block of data object with a memory by the server, a packet transmitting process for packeting each block into a moving picture stream and transmitting it to the client by the server, a depacketing process for receiving the moving picture stream packet and obtaining a stream by depacketing the received moving picture stream packet by the client, and a moving picture reproducing process for reproducing the multimedia data by synchronizing the stream by the client.

DETAILED DESCRIPTION OF THE PREFERRED EMBODIMENT

In order to separate a file structure in accordance with the present invention from other file formats, a file structure in accordance with the present invention is defined as an ISF (Internet streaming file format). And, it is self-evident that a stream file having the above-mentioned file structure has *.isf format as an extension.

Figure 1:
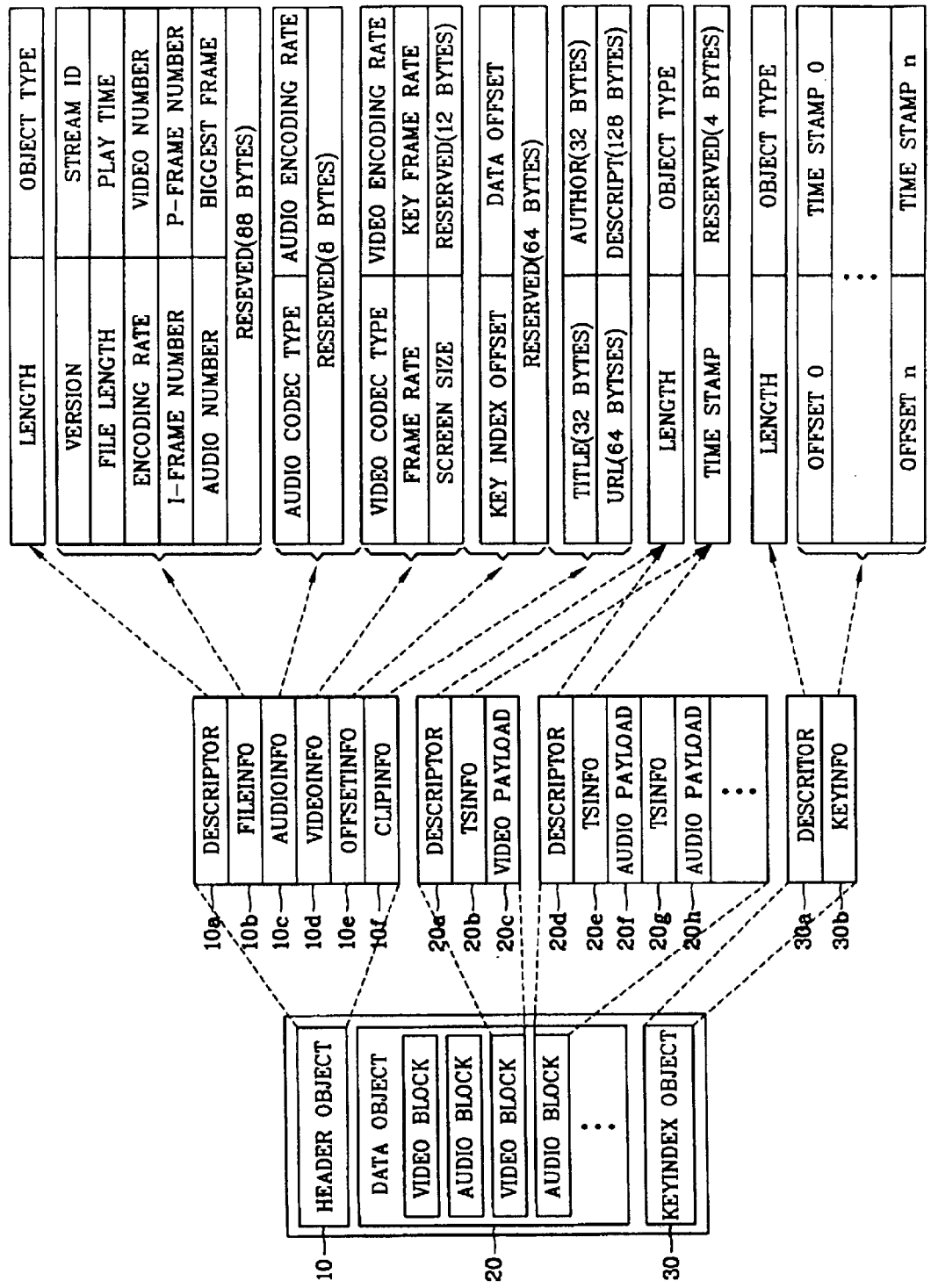
FIG. 1 is an exemplary view illustrating a file structure for a streaming service by each hierarchy in accordance with the present invention.

FIG. 1 is an exemplary view illustrating a file structure for a streaming service by each hierarchy in accordance with the present invention. As depicted in FIG. 1, a file structure for a streaming service in accordance with the present invention includes a header object 10 having general information about a file and information about application services, a data object 20 synchronizing multimedia data such as video and audio data with temporal information and storing it, and a key-index object 30 storing an offset and temporal information of a video block having a key frame in video blocks as a basis on a time axis for random access and reproduction.

In more detail, the ISF file is constructed with a video block and an audio block in data object construction and can add various media blocks for additional services in data object construction. In addition, an object for additional services can be additionally constructed below the key index object 30.

In more detail, the header object 10 can sufficiently store necessary information with a size of 512 byte, and the data object 20 and the key index object 30 can be set as various sizes according to encoding circumstances. For example, when a TEXTINFO (text information) is added to the header object 10 in order to add a caption function, the size of other fields is decreased in the header object 10, and a text block is generated in the data object 20.

The construction of each object will be described in more detail.

First, the header object 10 is constructed with a descriptor 10a for a classification or an index of information, a FILEINFO (file information) 10b storing overall information of a file, an AUDIOINFO (audio information) 10c storing information related to audio media, a VIDEOINFO (video information) 10d storing information related to video media, an OFFSET INFO (offset information) 10e defining positions of the data object 20 and the key index object 20 in an ISF file in order to search the positions easier, and a CLIPINFO (additional information) 10f storing additional information necessary for a user.

Herein, the descriptor 10a is constructed with a length field indicating the total size of the header object 10 and an object type field indicating a kind of the object.

The FILEINFO 10b is constructed with a version field indicating version information of an ISF file format, an ID field indicating a file generation end time with a stream ID, a file length field indicating the total length of the ISF file, a play time field indicating the total play time, an encoding rate field indicating an encoding rate defined by a user, a video number field indicating the number of encoded video frames in the data object of the ISF file, an I-frame number field indicating the number of key frames in the encoded video frames in the data object of the ISF file, a P-frame number field indicating the number of P-frames in the encoded video frames in the data object of the ISF file, an audio number field indicating the number of audio blocks in the encoded audio blocks in the data object of the ISF file, a biggest video frame field indicating a size of the biggest frame in the encoded video frames in the data object of the ISF file, and a reserved field reserved for future application.

The AUDIOINFO 10c is constructed with audio codes type filed indicating a kind of an audio codec generating an audio block in the data object, an audio rate field indicating an audio encoding rate, and a reserved field for future applications.

The VIDEOINFO 10d is constructed with a video codec type field indicating a kind of the video codec generating a video block in the data object, a video encoding rate field indicating a video encoding rate, a frame rate field indicating the number of encoding video frames per second, a key frame rate field indicating an input time of the key frames per second, a screen size field indicating a size of the encoded picture, and a reserved field for future applications.

The OFFSETINFO 10e is constructed with a data offset field indicating a position of the data object, a key index offset field indicating a position of the key index object, and a reserved field for future applications.

The CLIPINFO 10f is constructed with a title field indicating a title of a file, an author field indicating a creator of the file, a URL field indicating related URL information and a description field for providing schematic contents description about the file.

Herein, the header object unit 10 can be designed so as to have a reserved field additionally for application such as an upgrade version or change. For example, when an additional TEXTINFO is included in the design, the additional TEXTINFO is constructed with a font field indicating a font of text, a size field indicating a size of the text, a color field indicating a color of the text, and a reserved field for future applications. Accordingly, the data object region 20 can further include various media blocks such as a text block, etc. for additional service.

The data object region 20 is constructed with a video block having information about video in multimedia data and an audio block having information about audio in the multimedia data, the video block and the audio block respectively include a descriptor 20a for classification or index of information, a TSINFO (time stamp information) 20b proceeding synchronization without defining a RTP protocol by defining a difference value between an initial time stamp, a video payload (video storage) 20c storing actual encoded video data, and an audio payload (audio storage) 20h storing actual encoded audio data.

Herein, one video block has a video payload, and video encoding frames are stored in the video payload. In addition, one audio block has a plurality of audio payloads, audio encoding frames are stored in the audio payloads. However, as described above, because the audio block can store a plurality of audio encoding frames, it further includes a TSINFO and an audio payload about each audio encoding frame.

Herein, each descriptor 20a, 20d includes a length field indicating a size of video and audio encoding data and an object type field indicating a kind of the object.

TSINFO 20b, 20e, 20g of each video and audio block respectively include a time stamp field storing differences between an initial time stamp, and a reserved field for future application.

The key index object is constructed with a descriptor 30a indicating classification or index of information and a KEYINFO (key frame information) 30b storing information about each key frame in video frames.

The descriptor 30a includes a length field indicating a total length of the KEYINFO and an object type field indicating a kind of THE object.

The KEYINFO 30b is constructed with an offset field indicating an offset value of a serial key-frame or an I-frame and a time stamp field for checking whether it is a right frame by comparing a time stamp value of a pertinent key-frame or I-frame with a time stamp value of the data object 20.

Herein, when new additional service is required, the service can be expanded by registering information about a position of the new additional service in the header object 10 and the data object 20.

The operation of the method for providing the streaming service in accordance with the present invention will be described.

First, in order to use a moving picture multimedia service, a client contacts to a server and receives the header object 10 from the server. Accordingly, the client receives the descriptor 10a, the FILEINFO 10b, the AUDIOINFO 10c, the VIDEOINFO 10d, the OFFSETINFO 10e, and the CLIPINFO 10f by parsing the header object 10. In more detail, the client can know the information about the streaming file, namely, a length, the play time, video information and audio information, etc. of the file.

After, when the client transmits a play order signal to the server in order to use the streaming service, the server reads the video block and the audio block of the data object 20 with the memory, performs packeting of moving picture stream and transmits it to the client. Then, the client obtains a stream by depacketing the moving picture stream packet, decodes the video block and the audio block, synchronizes it as a video signal and an audio signal, and reproduces the moving picture.

Herein, in order to reproduce the moving picture at the same point in real time, the client obtains a time stamp of the moving picture in the TSINFO 20b, 20e, 20g of the video block and the audio block and reproduces it by synchronizing the video block and the audio block at the same time according to the time stamp of the moving picture. In order to reproduce a certain point of the moving picture, the client transmits a time stamp of the moving picture to be produced to the server through a set position instruction. Then, the server obtains an offset value matched to the time stamp of the moving picture transmitted from the client in the KEY-INFO 30b of the key index object 30. Accordingly, the server reads the video block and the audio block from the matched offset position and transmits it to the client. In more detail, the random access and reproduction can be performed by using the key index information, it is possible to perform various reproduction functions such as a fast play, a reverse play and a random reproduction, etc.

Figure 2:
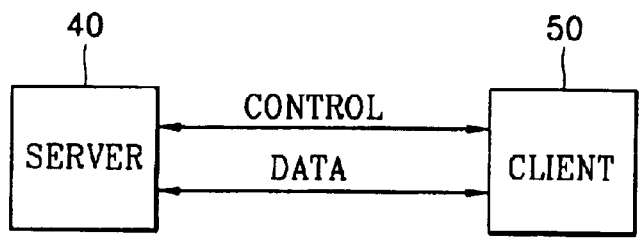
FIG. 2 is an exemplary view illustrating a connection operation for a moving picture service between a client and a server.

FIG. 2 is an exemplary view illustrating a connection operation for a moving picture service between a client 50 and a server 40.

As depicted in FIG. 2, the server 40 and the client 50 have two channels in order to perform a moving picture service. One channel is a control channel, and the other channel is a data channel. Instructions required for the moving picture streaming are transmitted through the control channel. And, moving pictures are transmitted through the data channel.

Herein, instructions between the server 40 and the client 50 can be constructed as below.

A connect instruction is used when the client 50 tries to contact to the server 40, a play instruction is used when the server 40 starts a moving picture transmission, a pause instruction is used when the moving picture transmission from the server 40 is temporarily stopped, a stop instruction is used when the moving picture transmission ends, a setposition instruction is used in order to move an offset of a file to be transmitted, and a disconnect instruction is used in order to release the connection with the server 40.

Figure 3:
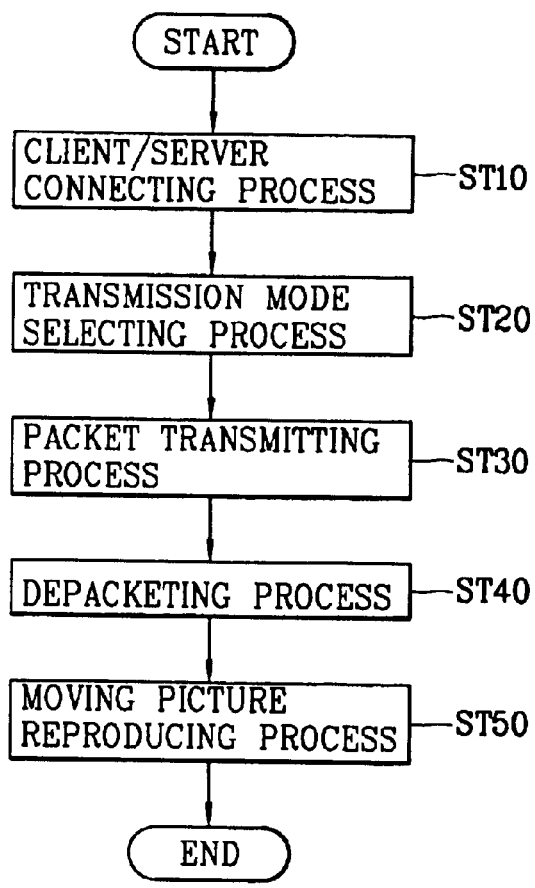
FIG. 3 is a flow chart illustrating a method for providing a streaming service using the file structure of FIG. 1 in accordance with the present invention.

FIG. 3 is a flow chart illustrating a method for providing a streaming service using the file structure of FIG. 1 in accordance with the present invention.

As depicted in FIG. 3, the method for providing the streaming service in accordance with the present invention includes a client/server connecting process as shown at step ST10 for receiving information of the header object 10 from the server 40 and transmitting a transmission instruction to the server 40 by the client 50, a transmission mode selecting process as shown at step ST20 for selecting a transmission mode by being received the transmission instruction and reading each block of the data object 20 with the memory, a packet transmitting process as shown at step ST30 packeting each block as a moving picture stream and transmitting it to the client 50, a depacketing process as shown at step ST40 for receiving the moving picture stream packet and obtaining the stream by depacketing the received moving picture stream packet, and a moving picture reproducing process as shown at step ST50 for receiving the stream and reproducing the multimedia data by synchronizing the received stream by the client 50.

Herein, in the transmission mode selecting process, the server can select an audio transmission mode, a video transmission mode and a video/audio simultaneous transmission mode according to a network bandwidth. In more detail, when a network bandwidth is low, the server is in an audio transmission mode and transmits only audio, when a network bandwidth is intermediate, the server is in a video transmission mode and transmits only video, when a bandwidth is sufficiently high, the server is in a video/audio simultaneous mode and transmits both video and audio. In addition, a media type transmission mode can be added besides the audio or video transmission mode. In addition, in the moving picture reproduction process, by the selection of the client, the client can reproduce a moving picture placed at the same point in real time or a certain point of the moving picture.

As described above, in the file structure for the streaming service in accordance with the present invention, data can be transmitted quickly by not including unnecessary additional data, it is possible to deal effectively with additional service expanding by using a reserved file, the application region can be expanded by including other media file at needs besides a video and an audio file, because a random access and random reproduction by key index information are possible, various reproduction functions such as a fast play, a reverse play and a random reproduction, etc. can be supported.

What is claimed is:

1. A computer readable medium for storing a file structure for providing a multimedia streaming service, comprising:

at least one header object including file and application service information;

wherein said at least one header object comprises:

a descriptor for information classification;

a FILEINFO field storing file information;

an AUDIOINFO field storing audio media information;

a VIDEOINFO field storing video media information;

an OFFSETINFO field providing positional information on said at least one data object and said at least one key object in the same file;

a CLIPINFO field storing additional user information;

at least one data obect synchronizing multimedia data with temporal information and storing said synchronizing miltimedia data, said at least one data object comprising at least one video block and at least one audio block, each of said at least one video block and said at least one audio block including a descriptor for information classification, a time stamp field and a reserved field for future applications, said at least one data object synchronizing said at least one video block and said at least one audio block according to said time stamp field without defining a real-time transport protocol (RTP); and at least one key index object storing offset and temporal information of said at least one video block, said stored information being used for random access and reproduction.

2. The file structure of claim 1, wherein said at least one header object further comprises at least one reserved field.

3. The file structure of claim 2, wherein said at least one reserved field is a TEXTINFO field adding a caption function to a moving picture.

4. The file structure of claim 3, wherein said TEXTINFO field includes:

a text font field;

a text color field;

a text size field; and a reserved field for future use.

5. The file structure of claim 1, wherein said descriptor includes:

a length field indicative of a video and audio encoding data size; and an object type.

6. The file structure of claim 1, wherein said FILEINFO field includes:
a file version information field;
an ID field indicating a file generation end time with a stream ID;
a file length field;
a playtime field indicating the total reproduction time;
an encoding rate field indicating an encoding rate defined by a user;
a video number field indicating the number of encoded video frames in said at least one data object;
an I-frame number field indicating the number of key frames in the encoded video frames in said at least one data object;
a P-frame number field indicating the number of P-frames in the encoded video frames in said at least one data object;
an audio number field indicating the number of encoded audio blocks in said at least one data object;
a biggest video frame field indicating the size of the biggest video frame in the encoded video frames in said at least one data object; and
a reserved field for future applications.

7. The file structure of claim 1, wherein said AUDIOINFO field includes:
an audio codec type field;
an audio encoding rate field indicating an audio encoding rate; and
reserved field for future applications.

8. The file structure of claim 1, wherein said VIDEOINFO field includes:
a video codec type field;
a video encoding rate field;
a frame rate field indicating the number of encoded video frames per second;
a key frame rate field;
a screen size field indicating the size of an encoded picture; and
a reserved field for future applications.

9. The file structure of claim 1, wherein said OFFSET-INFO field includes:
a data offset field indicating the position of said at least one data object;
a key index offset field indicating the position of said at least one key index object; and
a reserved field for future applications.

10. The file structure of claim 1, wherein said CLIPINFO field includes:
a file title field;
a file author field;
a uniform resource locator (URL) field; and
a file contents description field.

11. The file structure of claim 1, wherein the said at least one header object further includes a reserved field used for upgrade version applications.

12. The file structure of claim 1, wherein said at least one data object further comprises at least one media block for an additional service.

13. The file structure of claim 1, wherein said at least one video block includes a video payload for storing video encoding frames.

14. The file structure of claim 1, wherein said at least one audio block includes an audio payload for storing audio encoding frames.

15. The file structure of claim 1, wherein said descriptor includes:
a length field indicating the size of video and audio encoding data; and
an object type field.

16. The file structure of claim 1, wherein said at least one key index object includes:
a descriptor for information classification; and
a KEYINFO field storing key frame information.

17. The file structure of claim 16, wherein said descriptor includes:
a KEYINFO length field; and
an object type field.

18. The file structure of claim 16, wherein said KEYINFO field includes:
serial key frame offset field; and
a time stamp field comparing a time stamp value of a pertinent key frame with a time stamp value of said at least one data object.

* * * * *